(12) United States Patent
Tedeschi

(10) Patent No.: US 7,665,839 B1
(45) Date of Patent: *Feb. 23, 2010

(54) COUPLING DEVICE WITH BREAKAWAY AND METHODS OF USING THE SAME

(76) Inventor: Nancy Tedeschi, 257 Riverview Rd., Rexford, NY (US) 12148-1642

( * ) Notice: Subject to any disclaimer, the term of this patent is extended or adjusted under 35 U.S.C. 154(b) by 0 days.

This patent is subject to a terminal disclaimer.

(21) Appl. No.: 12/323,229

(22) Filed: Nov. 25, 2008

Related U.S. Application Data

(63) Continuation-in-part of application No. 12/196,227, filed on Aug. 21, 2008.

(51) Int. Cl.
*G02C 11/02* (2006.01)

(52) U.S. Cl. .......................................... 351/52; 351/51
(58) Field of Classification Search .................. 351/51, 351/52, 41, 158, 111, 121
See application file for complete search history.

(56) References Cited

U.S. PATENT DOCUMENTS

| | | | |
|---|---|---|---|
| 1,541,518 A | 6/1925 | McCain | |
| 1,662,834 A | 3/1928 | Reiter | |
| 2,177,978 A | 10/1939 | Darvie | |
| 2,230,984 A | 2/1941 | Chernow | |
| 2,382,019 A | 8/1945 | Miller | |
| 2,542,340 A | 2/1951 | Mauraton | |
| 2,552,265 A | 5/1951 | Edwards | |
| 3,307,444 A | 3/1967 | Money | |
| 3,968,661 A | 7/1976 | Williams | |
| 4,345,848 A | 8/1982 | Cheselka | |
| 4,968,128 A * | 11/1990 | Mendola | 351/52 |
| 5,077,931 A | 1/1992 | Marshall | |
| 5,161,234 A | 11/1992 | Nitta | |
| 5,615,850 A | 4/1997 | Cloninger | |
| 5,651,652 A | 7/1997 | Williams et al. | |
| 5,675,988 A | 10/1997 | Ignatowski | |
| 5,699,140 A | 12/1997 | Fuhrman | |
| 5,863,168 A | 1/1999 | Demarray | |
| 5,896,184 A | 4/1999 | Lowe et al. | |
| 5,906,029 A | 5/1999 | Fox | |

(Continued)

FOREIGN PATENT DOCUMENTS

JP           4-46420 U           4/1992

OTHER PUBLICATIONS

Cameron & Barkley Company Catalog No. 26 (c) 1926 pp. 173, 187.

*Primary Examiner*—Hung X Dang
(74) *Attorney, Agent, or Firm*—Gerald F. Dudding; GFD Patents LLC

(57) ABSTRACT

A coupling device with a breakaway tab and methods of using the same for operably coupling an ornament to a side arm of an apparatus having ornamentation. The coupling device comprises an elongated body having openings at each end. One opening has been adapted to receive a screw of a side arm, the other to receive an ornamental fastener. A breakaway tab or non-threaded portion of the elongated stem is provided to manipulate the screw and coupling device so the coupling device may be inserted between a head of the screw and an inside surface of the side arm. After engaging the side arm by the screw, the breakaway tab or non-threaded portion of the elongated stem of the screw may be broken off at a breakaway and discarded.

23 Claims, 16 Drawing Sheets

U.S. PATENT DOCUMENTS 6,152,737 A     11/2000  Beaty et al.
6,520,635 B1     2/2003  Ignatowski
6,863,394 B1     3/2005  Nelson et al.
2001/0048860 A1  12/2001  Ross et al.
2007/0228743 A1  10/2007  Kawano

* cited by examiner

100

105
providing an eyeglass hinge from which the screw has been removed from a hollow threaded channel;

110
providing a coupling device comprising: an elongated body having first and second sections, wherein a first surface of each section has an opening therein, wherein the opening in the first surface of the first section has been adapted to receive a screw for operably coupling the coupling device to the hinge and the opening in the first surface of the second section has been adapted to receive an ornamental fastener; a breakaway tab, releasably coupled to the elongated body; and a breakaway, therebetween, wherein the breakaway is not between the breakaway tab and an end of the first section of the elongated body;

Go To Step 115

Fig. 6A

100 

```
┌─────────────────────────────────┐
│          Step 110               │
└─────────────────────────────────┘
                │
                ▼                                    115
┌─────────────────────────────────┐                 /
│ providing a screw having a head, and│
│ either an elongated stem having a   │
│ threaded first portion adjacent to the│
│ head of the screw and a releasably  │
│ coupled non-threaded second portion │
│ extending from the threaded first portion, │
│ and a breakaway therebetween, or an │
│ elongated stem having a threaded first │
│ portion adjacent to the head of the screw │
│ without a non-threaded second portion │
│ extending from the threaded first portion, │
│ a breakaway tab releasably coupled to │
│ the head of the screw and a breakaway │
│ therebetween; and                   │
└─────────────────────────────────┘
                │
                ▼
┌─────────────────────────────────┐
│         Go To Step 120          │
└─────────────────────────────────┘
```

| Step 115 |

↓

120 inserting the coupling device between a head of the screw and a first surface of the hinge and rotating the screw, by aligning either the non-threaded second portion of the elongated stem with the opening in the first surface of the first section of the coupling device and with the hollow threaded channel of the hinge or the threaded first portion of the elongated stem without the non-threaded second portion extending from the threaded first portion by manipulating either the non-threaded second portion of the elongated stem and the breakaway tab of the coupling device or breakaway tab releasably coupled to the head of the screw and the breakaway tab releasably coupled to the elongated body so that the threaded first portion of the elongated stem engages the threads of the hollow threaded channel of the hinge.

Fig. 6C

900 providing a side arm of the apparatus having ornamentation having an inside surface; — 905 providing a coupling device comprising: an elongated body having first and second sections, wherein a first surface of each section has an opening therein, wherein the opening in the first surface of the first section has been adapted to receive a screw for operably coupling the coupling device to the inside surface of the side arm and the opening in the first surface of the second section has been adapted to receive an ornamental fastener; a breakaway tab, releasably coupled to the elongated body; and a breakaway, therebetween, wherein the breakaway is not between the breakaway tab and an end of the first section of the elongated body; — 910

Go To Step 915

Fig. 12A

900 

| Step 910 |
|---|

↓ 915 providing a screw having a head, and either an elongated stem having a threaded first portion adjacent to the head of the screw and a releasably coupled non-threaded second portion extending from the threaded first portion, and a breakaway therebetween, or an elongated stem having a threaded first portion adjacent to the head of the screw without a non-threaded second portion extending from the threaded first portion, a breakaway tab releasably coupled to the head of the screw and a breakaway therebetween ; and

↓

| Go To Step 920 |
|---|

Step 915 and inserting the coupling device between a head of the screw and the inside surface of the side arm and rotating the screw, by aligning either the non-threaded second portion of the elongated stem with the opening in the first surface of the first section of the coupling device and with the inside surface of the side arm or the threaded first portion of the elongated stem without the non-threaded second portion extending from the threaded first portion by manipulating either the non-threaded second portion of the elongated stem and the breakaway tab of the coupling device or breakaway tab releasably coupled to the head of the screw and the breakaway tab releasably coupled to the elongated body so that the threaded first portion of the elongated stem fastens the coupling device to the inside surface of the side arm.

COUPLING DEVICE WITH BREAKAWAY AND METHODS OF USING THE SAME

The present patent application is a continuation-in-part claiming priority from non-provisional application with Ser. No. 12/196,227 (filed Aug. 21, 2008 and titled "Coupling Device With Breakaway and Methods of Using the Same").

FIELD OF THE INVENTION

The present invention relates generally to fasteners. More specifically, the invention relates to coupling devices and their uses in joints.

BACKGROUND

Eyeglasses are a necessary part of everyday attire for some people, including full-time or part-time eyeglass wearers. And although contact lenses are an option for some people, there are those who cannot or will not tolerate contact lenses for a variety of reasons. In addition, some people do not mind or actually like to wear eyeglasses, i.e., particularly with attractive and stylish eyeglass frames. Eyeglass frames come in a wide variety of styles, but are typically not replaced more frequently than annually, for example, due to expense as well as other factors, such as the time needed and often difficult decision in picking out new frames.

Eyeglasses or not, most people do exhibit some degree of vanity. Indeed, some people like to add style or decoration to any aspect of their wardrobe. Moreover, some people particularly enjoy adding jewelry or other decorative articles to enhance their "look" in creative and classy ways, with respect to either their daily attire, or for particular outings or special events.

Accordingly, it is desirable to provide a novel way for people to decorate their attire, particularly those who wear eyeglasses.

It is also desirable to provide a novel way to decorate an eyeglass frame.

SUMMARY OF THE INVENTION

A first aspect of the present invention provides an ornamented eyeglass apparatus, comprising: an eyeglass frame; a first side piece, wherein a proximal end of the first side piece is operably coupled to a first end of the frame by a first hinge therebetween; and an ornament suspended from the apparatus, wherein the ornament is not directly suspended from either of the sidepieces or from a screw in the first or second hinge.

A second aspect of the present invention provides an ornamented eyeglass apparatus, comprising: an eyeglass frame; a first side piece, comprising an inside surface; a coupling device operably coupled to the inside surface, comprising: an elongated body having first and second sections, wherein a first surface of each section has an opening therein, wherein the opening in the first surface of the first section has been adapted to receive a screw for operably coupling the coupling device to the inside surface of the first side piece and the opening in the first surface of the second section has been adapted to receive an ornamental fastener; a breakaway tab, releasably coupled to the elongated body; and a breakaway, therebetween, wherein the breakaway is not between the breakaway tab and an end of the first section of the elongated body.

A third aspect of the present invention provides a method for operably coupling an ornament to an inside surface of a side arm of an apparatus having ornamentation, comprising: providing a side arm having an inside surface; providing a coupling device comprising: an elongated body having first and second sections, wherein a first surface of each section has an opening therein, wherein the opening in the first surface of the first section has been adapted to receive a screw for operably coupling the coupling device to the inside surface of the side arm and the opening in the first surface of the second section has been adapted to receive an ornamental fastener; a breakaway tab, releasably coupled to the elongated body; and a breakaway, therebetween, wherein the breakaway is not between the breakaway tab and an end of the first section of the elongated body; providing a screw having a head, and either an elongated stem having a threaded first portion adjacent to the head of the screw and a releasably coupled non-threaded second portion extending from the threaded first portion, and a breakaway therebetween, or an elongated stem having a threaded first portion adjacent to the head of the screw without a non-threaded second portion extending from the threaded first portion, a breakaway tab releasably coupled to the head of the screw and a breakaway therebetween; and inserting the coupling device between a head of the screw and the inside surface of the side arm and rotating the screw, by aligning either the non-threaded second portion of the elongated stem with the opening in the first surface of the first section of the coupling device and with the inside surface of the side arm or the threaded first portion of the elongated stem without the non-threaded second portion extending from the threaded first portion by manipulating either the non-threaded second portion of the elongated stem and the breakaway tab of the coupling device or breakaway tab releasably coupled to the head of the screw and the breakaway tab releasably coupled to the elongated body so that the threaded first portion of the elongated stem fastens the coupling device to the inside surface of the side arm.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 6A-6C depict a flow diagram of a method for inserting a coupling device in an eyeglass hinge, in accordance with embodiments of the present invention;

FIGS. 12A-12C depict a flow sheet of a method for operably coupling an ornament to an inside surface of a side arm of an apparatus having ornamentation, in accordance with embodiments of the present invention.

DETAILED DESCRIPTION OF EMBODIMENTS OF THE INVENTION

Figure 1:
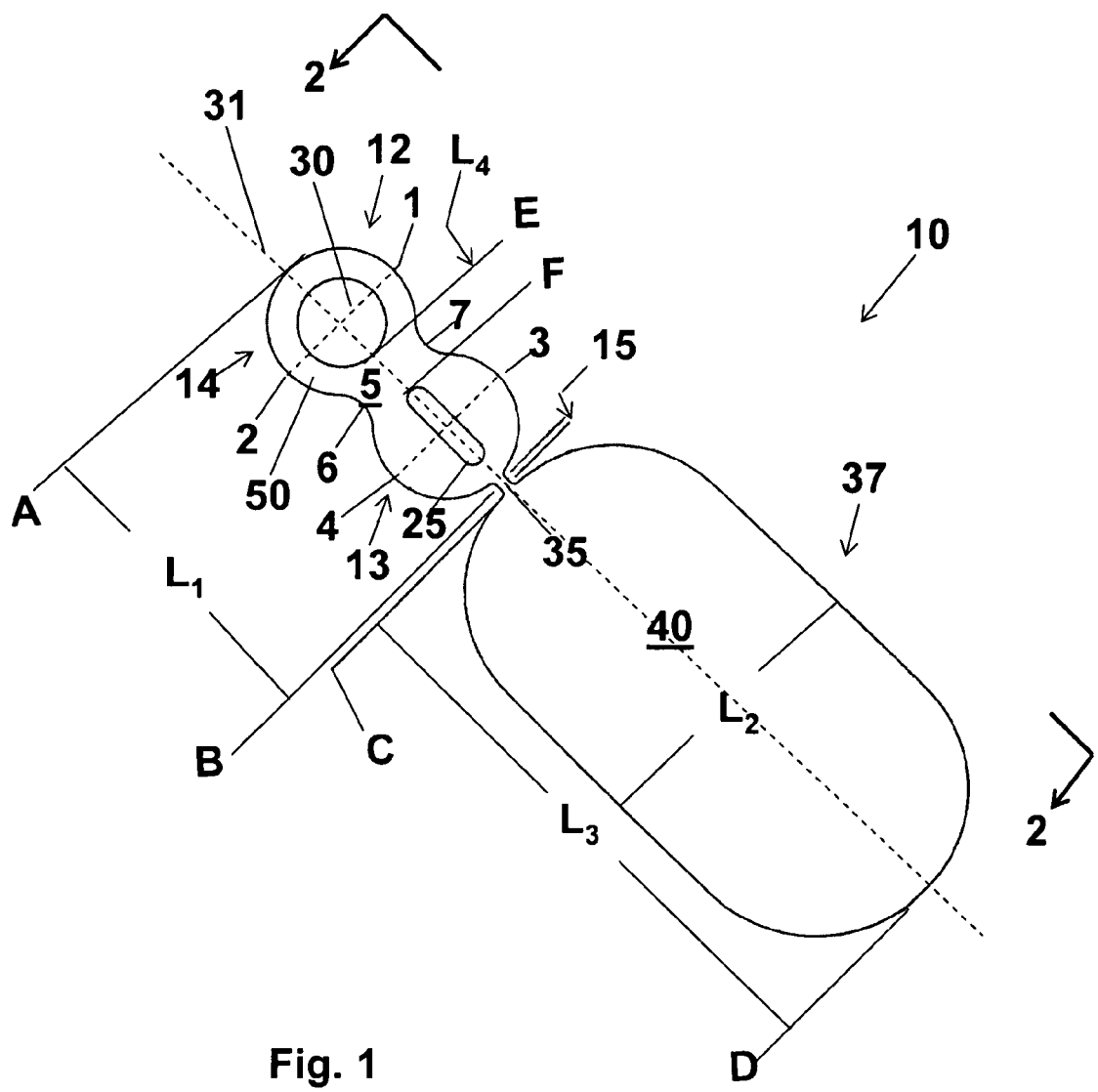
FIG. 1 depicts a top plan view of the coupling device, in accordance with embodiments of the present invention.

FIGS. 1-5 depict a coupling device 10, comprising: an elongated body 14 having first and second sections 12, 13. A first surface 50 of each section 12, 13 has an opening 30, 25 therein. The opening 30 in the first surface 50 of the first section 12 has been adapted to receive a screw 70 and the opening 25 in the first surface 50 of the second section 13 has been adapted to receive an ornamental fastener 80. The coupling device 10, comprises a breakaway tab 37 releasably coupled to the elongated body 14 and a breakaway 35, therebetween, wherein the breakaway 35 is not between the breakaway tab 37 and an end A of the first section 12 of the elongated body 14.

FIG. 1 depicts a top plan view of the coupling device 10. In one embodiment, a length $L_1$, between ends A and B of the elongated body 14 may be from about 0.225 in. to about 0.275 in. The openings 30 and 25 extend completely through both the first surface 50 and the surface facing away from the first surface 50.

In one embodiment, the centers of the opening 30, 25 may lie on a longitudinal axis 31 of the coupling device 10. A length from about 0.112 in. to about 0.138 in. may separate the centers of the opening 30, 25 along the longitudinal axis 31 of the coupling device 10.

Point E on the perimeter of opening 30, and point F on the perimeter of opening 25 define the nearest adjacent points along adjacent portions of the perimeter around each opening 30 and 25. In one embodiment, points E and F are separated by a length $L_4$ that is from about 0.035 in. to about 0.045 in.

In one embodiment, the opening 30 may be oval and have a diameter from about 0.0675 in. to about 0.0825 in.

In one embodiment, the opening 25 may be elliptical and have a width of from about 0.020 in. +/−10% and a length from about 0.066+/−10%.

In one embodiment, the first and second sections 12 and 13 of the elongated body 14 of the coupling device 10 are lobes of a planar figure eight that are co-planar with the first surface 50. The points 1, 2 define a diameter of the first end 12 and the points 3, 4 define a diameter of the second end 13 of the elongated body 14 of the coupling device 10. The first end 12 tapers from points 1, 2 to points 6 and 7 of a mid-section 5 between the first and second sections 12 and 13, and the second end 13 tapers from point 3, 4 to points 6 and 7 of the mid-section 5 between the first and second sections 12 and 13, so that the elongated body 14 has the shape of a planar figure eight. Hereinafter "taper" is defined as a gradual decrease in thickness or width of an elongated object to the points 6 and 7 of a mid-section 5 between the first and second sections 12 and 13. In this embodiment, the width $L_4$, between the points E and F of the midsection 5, is narrower than the diameters of either of the first and second sections 12 and 13.

In one embodiment, the diameter of the first and second sections 12, 13 may be from about 0.10 in. to about 0.13 in.

The breakaway 35 may releasably couple the elongated body 14 to the breakaway tab 37. Hereinafter, a "breakaway" is defined as a releasable coupling between the breakaway tab 37 and a distal end B of the elongated body 14. Hereinafter, "distal end of the elongated body 14" is defined as the further point along the elongated body 14 in reference to the opening 30 of the first end 12 of the elongated body 14.

For embodiments of the coupling device 10, the breakaway is advantageously not between the breakaway tab 37 and a proximal end A of the elongated body 14. Hereinafter, "proximal end of the elongated body 14" is defined as the nearer point along the elongated body 14 in reference to the opening 30 of the first end 12 of the elongated body 14.

Hereinafter "releasably coupling" or "releasable couple" is defined as forming or braking or cleaving or severing a mechanical and physical coupling between the distal end B of the elongated body 14 and the point C of the breakaway tab 37.

Hereinafter, "operably coupled" or "operable coupling" is defined as physically and mechanically attaching or joining, wherein the pieces attached or joined are free to rotate, pivot, or slide.

The coupling device 10, which includes the elongated body 14, the breakaway tab 37, and the breakaway 35, may be made of stainless steel, brass, nickel/sliver, carbon steel, titanium, or other appropriate metals or metal alloys.

In one embodiment, a width $L_2$ of the breakaway tab 37 may be from about 0.225 in. to about 0.275 in. and a length $L_3$ of the breakaway tab 37, between points C and D, may be from about 0.45 in. to about 0.55 in.

In one embodiment, a width of the breakaway 35 is less than or equal to 0.010 in. +/−10%, and a length of the breakaway 35 is less than or equal to from about 0.005 in. to about 0.007 in. when the diameter of the opening 30 is from about 0.0675 in. to about 0.0825 in.

Figure 2:
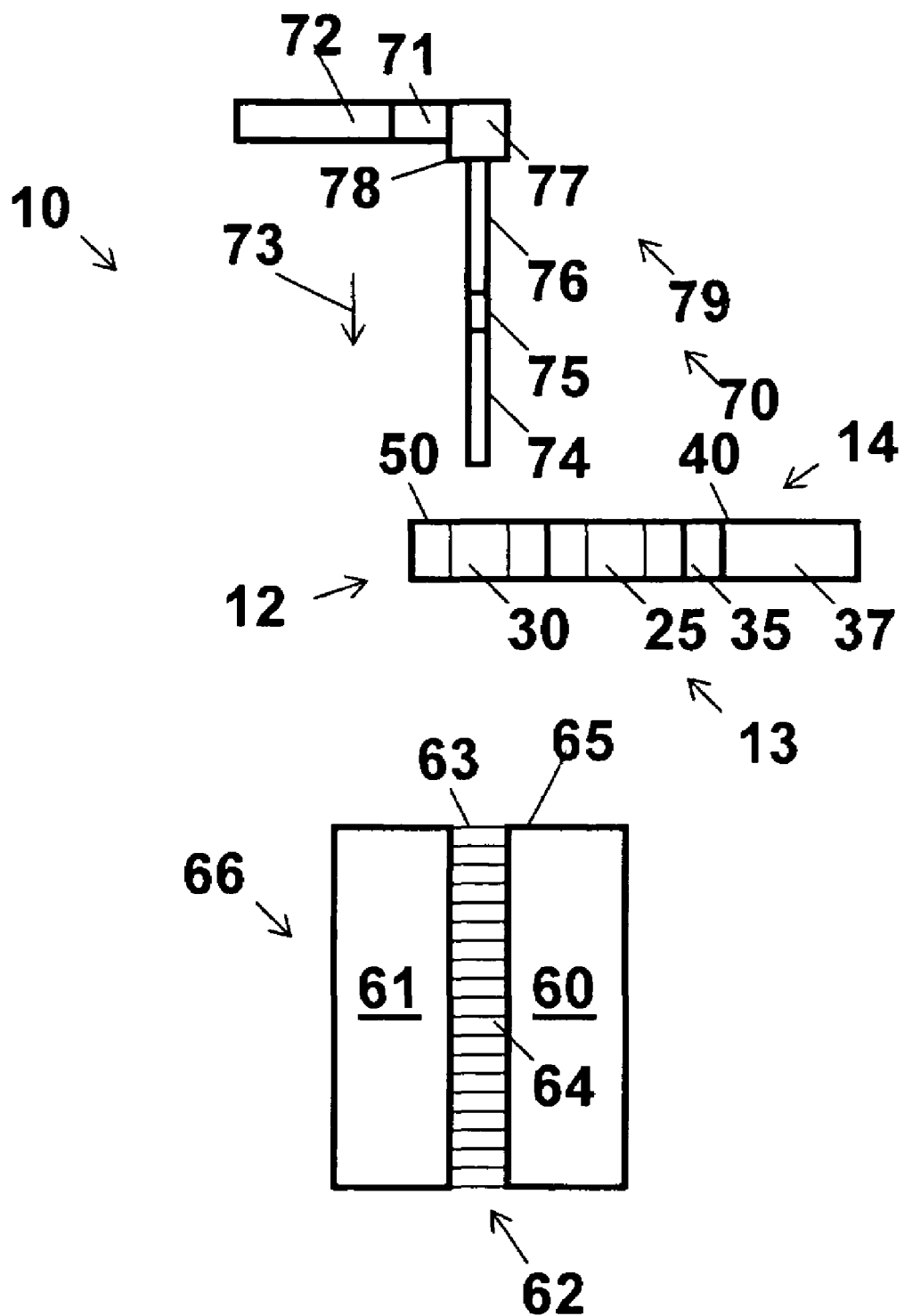
FIG. 2 depicts a longitudinal cross-sectional view of the coupling device, taken along the line 2-2, depicted in FIG. 1, in accordance with embodiments of the present invention.

FIG. 2 depicts a longitudinal cross-sectional view of the coupling device 10, taken along the line 2-2, depicted in FIG. 1, further comprising a screw 70 and a hinge 66, the hinge 66, comprising first and second straps 60, 61, pivotably coupled to a cylinder 62. The cylinder 62 has a hollow threaded channel 64 therein. The screw 70, comprises: a breakaway tab 74 and a breakaway 75 therebetween. The screw 70 may have a threaded first portion 76 and a non-threaded second portion 74 with a breakaway 75, therebetween. Alternatively, the screw 70 may have a threaded first portion 76 without the non-threaded second portion 74. In this embodiment, the screw head 77 of the screw 70 may be releasably coupled to a breakaway tab 72 with a breakaway 71 therebetween. The screw 70 has been disclosed in FIGS. 1A, 1B, 2A, 2B, 3A, and 3B, and associated text, therein, of U.S. patent application Ser. No. 12/187,254, dated Aug. 6, 2008 and disclosed by Nancy Tedeschi, the inventor of the present application, and is hereby incorporated by reference.

In one embodiment, the coupling device 10 may advantageously be installed between a first surface 78 of a screw head 77 and a first surface 65 of the hinge 66, and a second end 13 having an opening 25, such as a slit in it to hang specialized ornaments from. The coupling device 10 may advantageously be installed by inserting the non-threaded second portion 74 of the screw 70 in the direction of the arrow 73 into the opening 30, and further into the hollow threaded channel 64 of the hinge 66.

The non-threaded second portion 74 of the screw 70 has been inserted into the hollow threaded channel 64 in the hinge 66 so that the threaded first portion 76 of the screw 70 catches at least one of the threads 63 of the hollow threaded channel 64 of the hinge 66. The screw 70 is tightened into the hollow threaded channel 64 by rotating the non-threaded second portion 74 clockwise so that the first surface 78 of the screw head 77 becomes coplanar with the first surface 50 of the first end 12 of the elongated body 14.

Alternatively, in the embodiment in which the screw 70 may have a threaded first portion 76 without the non-threaded second portion 74, and the breakaway tab 72 releasably coupled to the screw head 77, the screw 70 may be tightened into the hollow threaded channel 64 by rotating the breakaway tab 72 and the threaded first portion 76 clockwise so that the first surface 78 of the screw head 77 becomes coplanar with the first surface 50 of the first end 12 of the elongated body 14. Hereinafter "releasably coupling" or "releasably coupled" is defined as forming or braking or cleaving or severing a mechanical and physical coupling between end C of the breakaway tab 37 and the distal end B of the elongated body 14.

Having the breakaway tab 37 releasably coupled to the distal end B of the elongated body 14 with the breakaway 35 therebetween, or releasable coupled to the screw head 77, advantageously enables installation of the elongated body 14, for example, the double washer, by inserting the screw 70 through the opening 30 and threading the threaded first portion 76 of the screw 70 into the hollow threaded channel 64 so that the first surface 78 of the screw head 77 becomes coplanar with the first surface 50 of the first end 12 of the elongated body 14 without obstruction or interference from any irregularities in the surface 40 of the breakaway tab 37 or non-planarity with the first surface 50 of the elongated body 14 because the breakaway tab 37 is not releasably coupled to the proximal end A of the elongated body 14. Likewise, the subsequent breaking off of the breakaway tab 37 from the breakaway 35 is not obstructed or interfered with by installing the elongated body 14 by making the first surface 78 of the screw head 77 flush with and tightened against the first surface 50 of the elongated body because the breakaway tab 37 is not releasably coupled to the proximal end A of the elongated body 14

The elongated body 14, for example, the double washer, may be in varying sizes and shapes. The breakaway tab 37 may be attached to the double washer by a breakaway 35 and after installation of the double washer may be broken off at the breakaway 35.

Figure 3:
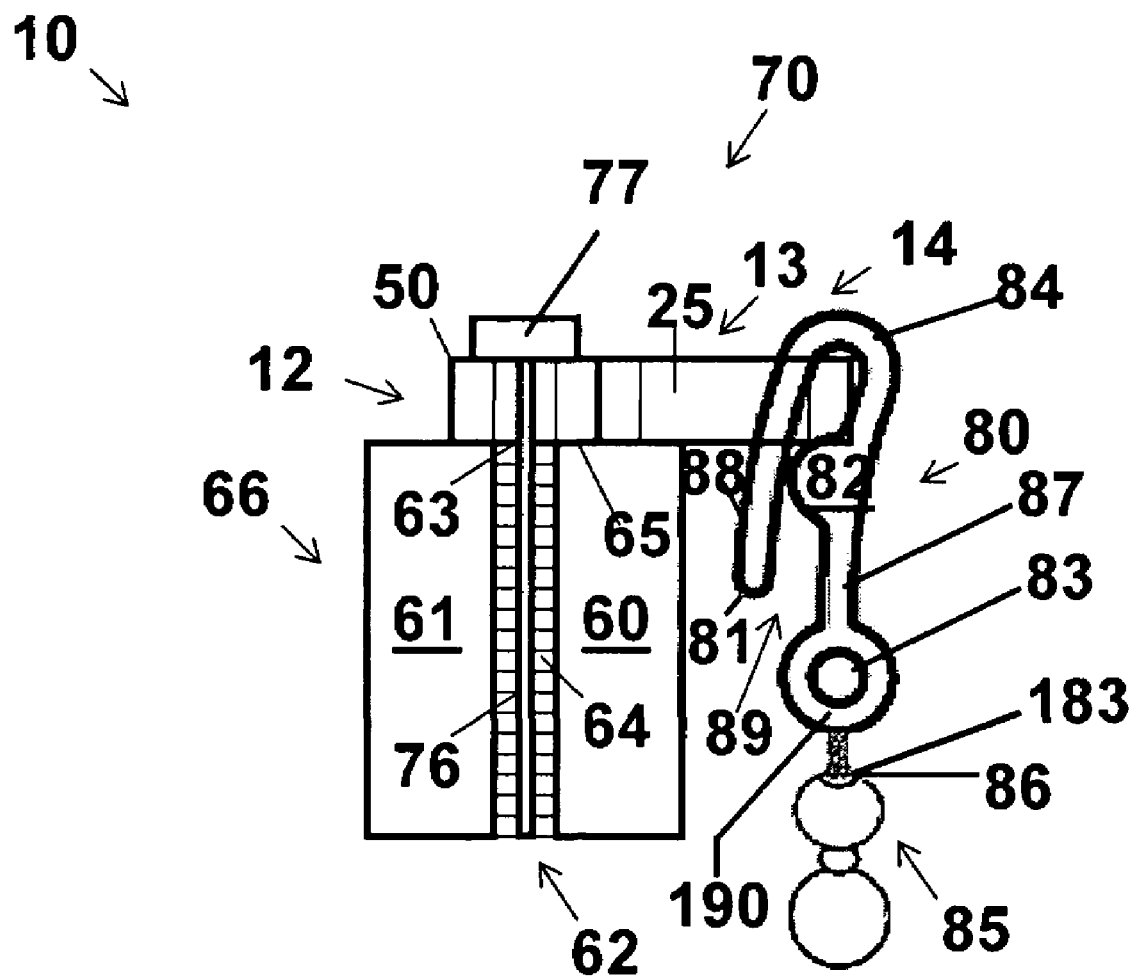
FIG. 3 depicts a longitudinal cross-sectional view of the coupling device, depicted in FIG. 2, and an exploded longitudinal cross-sectional view of the coupling device, depicted in FIG. 5, in accordance with embodiments of the present invention.
Figure 5:
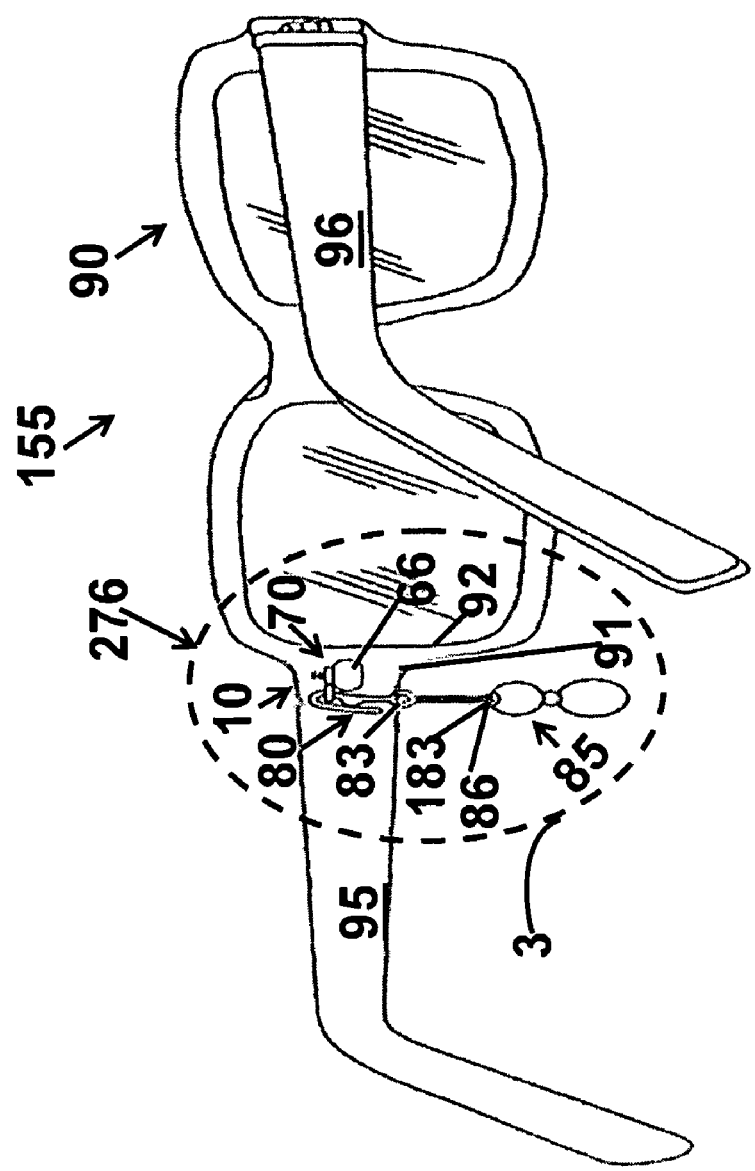
FIG. 5 depicts a side elevation view of an apparatus having ornamentation, in accordance with embodiments of the present invention.

FIG. 3 depicts a longitudinal cross-sectional view of the coupling device 10, depicted in FIG. 2, and an exploded longitudinal cross-sectional view of the coupling device 10, depicted in FIG. 5, after the releasably coupled breakaway tab 37, 72 has been broken off at the breakaway 35, 71 and an ornamental fastener 80 has been operably coupled to the second end 13 of the elongated body 14. The ornamental fastener 80 comprises an eyelet 190, an eyelet opening 83, a shank 87, a lock 82, a bend 84, a grip 88, and an end 81. Hereinafter, an "eyelet" is defined as a metal ring or grommet, or short metallic tube, the ends of which can be bent outward and over to fasten it in place; used to line an eyelet hole. An eyelet opening is defined as a hole made for an eyelet.

The end 81 of the ornamental fastener 80 has been inserted into the opening 25 of the second end 13 of the elongated body 14, so that the lock 82 spans the gap 89 between the shank 87 and the grip 88, so that the lock 82 may block removal of the ornamental fastener 80 from the opening 25 of the second end 13 of the elongated body 14.

The eyelet opening 83 of the eyelet 190 of the fastener 80 may be operably coupled to the ornament 85 using eyelet 86 of the ornament 85. The eyelet 86 of the ornament 85 may be operably coupled to the eyelet 190 of the fastener 80, for example, by threading one end of a string through the eyelet opening 83 and tied to the eyelet 190 of the fastener 80 and the other end threaded through the eyelet opening 183 of the eyelet 86 of the ornament 85, and tied to the eyelet 86 of the of the ornament 85.

The eyelet 86 may be a split ring washer that operably couples the eyelet 190 to an eyelet 86 of the ornament 85 by inserting the eyelet 190 into the slot of the split ring washer and then mechanically forcing the slot to close.

The ornament 85 may be an extended ornamental chain 185 comprising decorative members such as pearls, cut glass, semi-precious stones, shells, black obsidian, onyx, mother-of-pearl, or diamonds.

Figure 4:
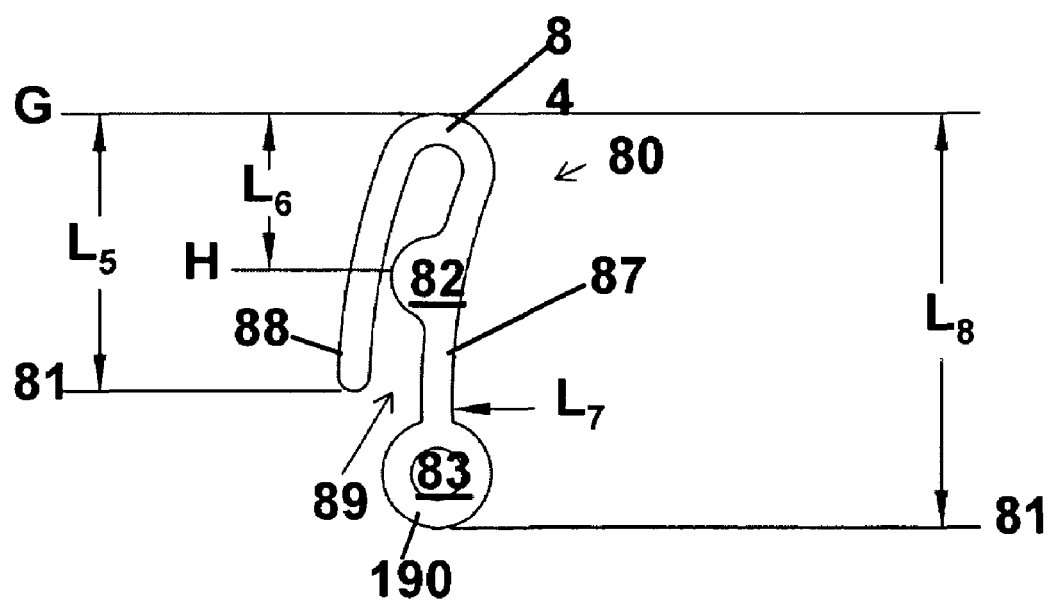
FIG. 4 depicts an exploded longitudinal cross-sectional view of the ornamental fastener 80 depicted in FIG. 3, in accordance with embodiments of the present invention.

FIG. 4 depicts an exploded longitudinal cross-sectional view of the ornamental fastener 80 depicted in FIG. 3. The ornamental fastener 80 comprises an eyelet 190, an eyelet opening 83, a shank 87, a lock 82, a bend 84, a grip 88, and an end 81. The lock 82 spans the gap 89 between the shank 87 and the grip 88, so that the lock 82 may block removal of the ornamental fastener 80 from the opening 25 of the second end 13 of the elongated body 14 when the end 81 of the ornamental fastener 80 has been inserted into the opening 25 of the second end 13 of the elongated body 14.

In one embodiment, a length $L_5$ between an apex G of the bend 84 and the end 81 of the ornamental fastener may be from about 0.24 in. to about 0.30 in. In another embodiment, the length $L_5$ between the tip of the bend 84 and the end 81 of the ornamental fastener may be from about 0.42 in. to about 0.53 in.

In one embodiment, a length $L_6$ between an apex H of the lock 82 and the apex G of the bend 84 may be from about 0.13 in to about 0.17 in. Alternatively, the length $L_6$ between an apex H of the lock 82 and the apex G of the bend 84 may be from about 0.24 in. to about 0.31 in.

In one embodiment, a width $L_7$ of the shank 87 of the ornamental fastener 80 may be from about 0.027 in. to about 0.33 in.

In one embodiment, a width of the gap 89 between the shank 87 and the grip 88 may be from about 0.045 in to about 0.055 in.

In one embodiment, a width of the gap 89 between the shank 87 and the apex H of the lock 82 may be from about 0.01 to 0.02 in.

In one embodiment, a diameter of the eyelet opening 83 may be from about 0.045 in. to about 0.055 in.

In one embodiment, a diameter of the eyelet 190 may be from about 0.095 in. to about 0.115 in.

In one embodiment, a length $L_8$ from the apex G of the bend 84 to the end 81 of the eyelet 190 is from about 0.36 in. to about 0.44 in. Alternatively, the length $L_8$ from the apex G of the bend 84 to the end 81 of the eyelet 190 is from about 0.56 in. to about 0.69 in.

FIG. 5 depicts a side elevation view of an ornamented eyeglass apparatus 155, comprising: an eyeglass frame 90, first and second side pieces 95, 96, and an ornamental assembly 276. The ornamental assembly 276 comprises the coupling device 10, after the releasably coupled breakaway tab 37, 72 has been broken off at the breakaway 35, 71. An ornamental fastener 80 has been operably coupled to the second end 13 of the elongated body 14. The ornamental fastener 80, also depicted in FIG. 3, and described in associated text, comprises an eyelet 190, an eyelet opening 83, a shank 87, a lock 82, a bend 84, a grip 88, and an end 81.

In one embodiment, the ornamented eyeglass apparatus 155 comprises an eyeglass frame 90. The eyeglass frame 90 comprises first and second side pieces 95, 96, wherein a proximal end 91 of the first side piece 95 is operably coupled to a first end 92 of the frame 90 by a first hinge 66 therebetween. An ornament 85 may be suspended from the apparatus 155, wherein the ornament 85 is not directly suspended from either of the sidepieces 95, 96 or from a screw 70 in the first hinge 66.

In one embodiment, the ornamented eyeglass apparatus 155 comprises a coupling device 10 operably coupled to the hinge 66, comprising: an elongated body 14 having first and second sections 12, 13, wherein a first surface 50 of each section 12, 13 has an opening 30, 25 therein, wherein the opening 30 in the first surface 50 of the first section 12 has been adapted to receive a screw 70 for operably coupling the coupling device 10 to the hinge 66 and the opening 25 in the first surface 50 of the second section 13 has been adapted to receive an ornamental fastener 80. The coupling device 10 comprises a breakaway tab 37, releasably coupled to the elongated body 14; and a breakaway 35, therebetween. In this embodiment, the breakaway 35 is not between the breakaway tab 37 and an end A of the first section 12 of the elongated body 14.

FIGS. 6A-6C depict a flow diagram of a method 100 for inserting a coupling device 10, as depicted in FIGS. 1-5, and described in associated text, herein, in a hinge 66 of an eyeglass frame 90.

A step 105 provides an eyeglass hinge 66 from which the screw 70 has been removed from a hollow threaded channel 64.

A step 110 of the method 100 provides a coupling device 10 comprising: an elongated body 14 having first and second sections 12, 13. A first surface 50 of each section 12, 13 has an opening 30, 25 therein. The opening 30 in the first surface 50 of the first section 12 has been adapted to receive a screw 70 for operably coupling the coupling device 10 to the hinge 66. The opening 25 in the first surface 50 of the second section 13 has been adapted to receive an ornamental fastener 80. The step 110 provides the coupling device 10, further comprising a breakaway tab 37, releasably coupled to the elongated body 14; and a breakaway 35, therebetween, wherein the breakaway 35 is not between the breakaway tab 37 and an end A of the first section 12 of the elongated body 14.

A step 115 of the method 100 provides a screw 70 having a head 77, and either an elongated stem 79 having a threaded first portion 76 adjacent to the head 77 of the screw 70 and a releasably coupled non-threaded second portion 74 extending from the threaded first portion 76, and a breakaway 75 therebetween, or an elongated stem 79 having a threaded first portion 76 adjacent to the head 77 of the screw 70 without a non-threaded second portion 74 extending from the threaded first portion 76, a breakaway tab 72 releasably coupled to the head 77 of the screw 70 and a breakaway 71 therebetween.

A step 120 of the method 100 provides inserting the coupling device 10 between a head 77 of the screw 70 and a first surface 65 of the hinge 66 and rotating the screw 70, by aligning either the non-threaded second portion 74 of the elongated stem 79 with the opening 30 in the first surface 50 of the first section 12 of the coupling device 10 and with the hollow threaded channel 64 of the hinge 66 or the threaded first portion 76 of the elongated stem 79 without the non-threaded second portion 74 extending from the threaded first portion 76 by manipulating either the non-threaded second portion 74 of the elongated stem 79 and the breakaway tab 37 of the coupling device 10 or breakaway tab 72 releasably coupled to the head 77 of the screw 70 and the breakaway tab 37 releasably coupled to the elongated body 14 so that the threaded first portion 76 of the elongated stem 79 engages the threads 63 of the hollow threaded channel 64 of the hinge 66.

Figure 7:
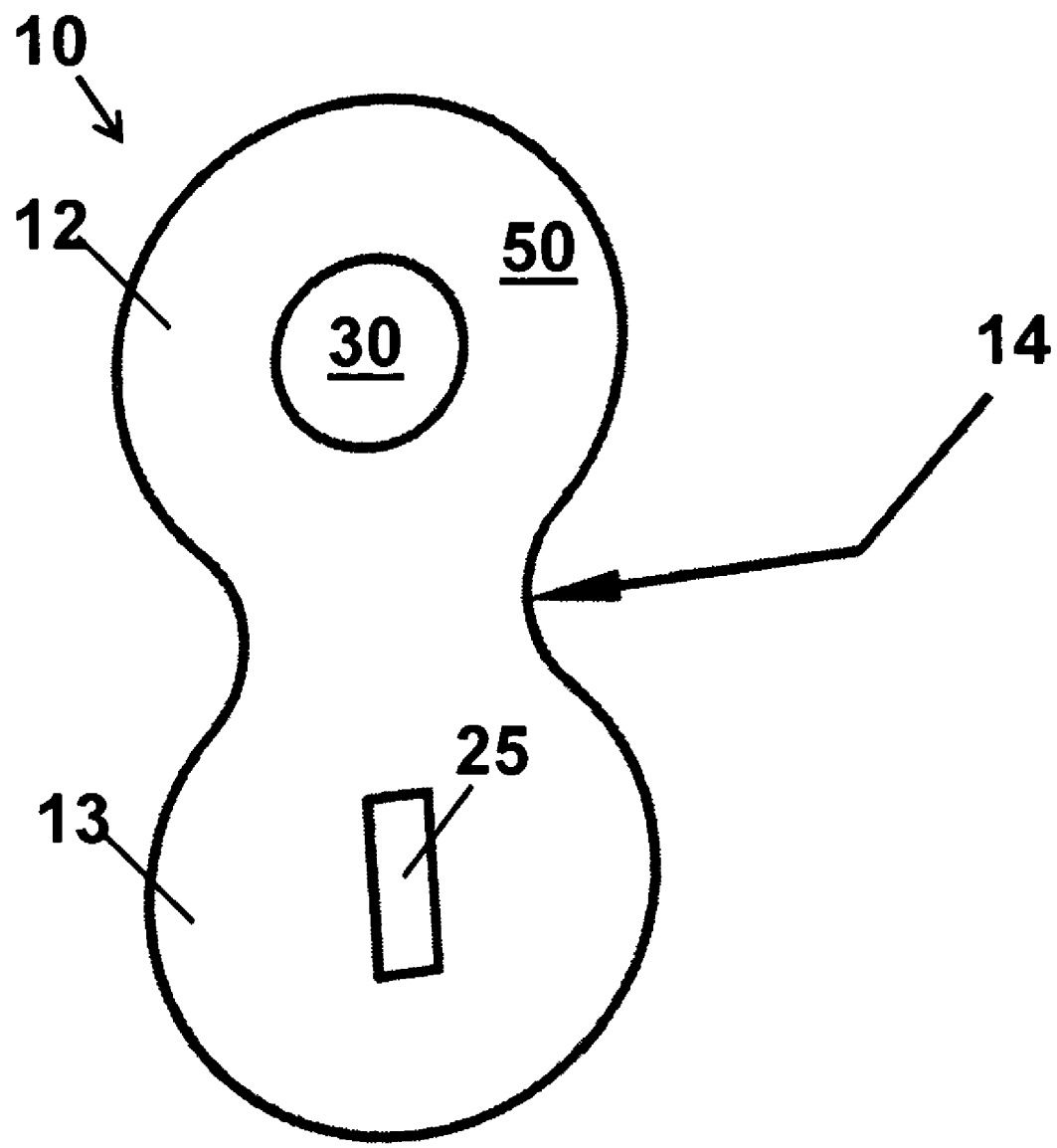
FIG. 7 depicts a longitudinal cross-sectional view of an elongated body, in accordance with embodiments of the present invention.

FIG. 7 depicts a longitudinal cross-sectional view of the elongated body 14 of the coupling device 10, depicted in FIG. 1, and described in associated text, herein, after the breakaway 37 has been removed. The elongated body 14 of the coupling device 10 comprises: first and second sections 12, 13. A first surface 50 of each section 12, 13 has an opening 30, 25 therein. The opening 30 in the first surface 50 of the first section 12 has been adapted to receive a screw 70, as depicted in FIG. 2 and described in associated text, and the opening 25 in the first surface 50 of the second section 13 has been adapted to receive an ornamental fastener 80, as depicted in FIG. 3 and described in associated text.

Figure 8:
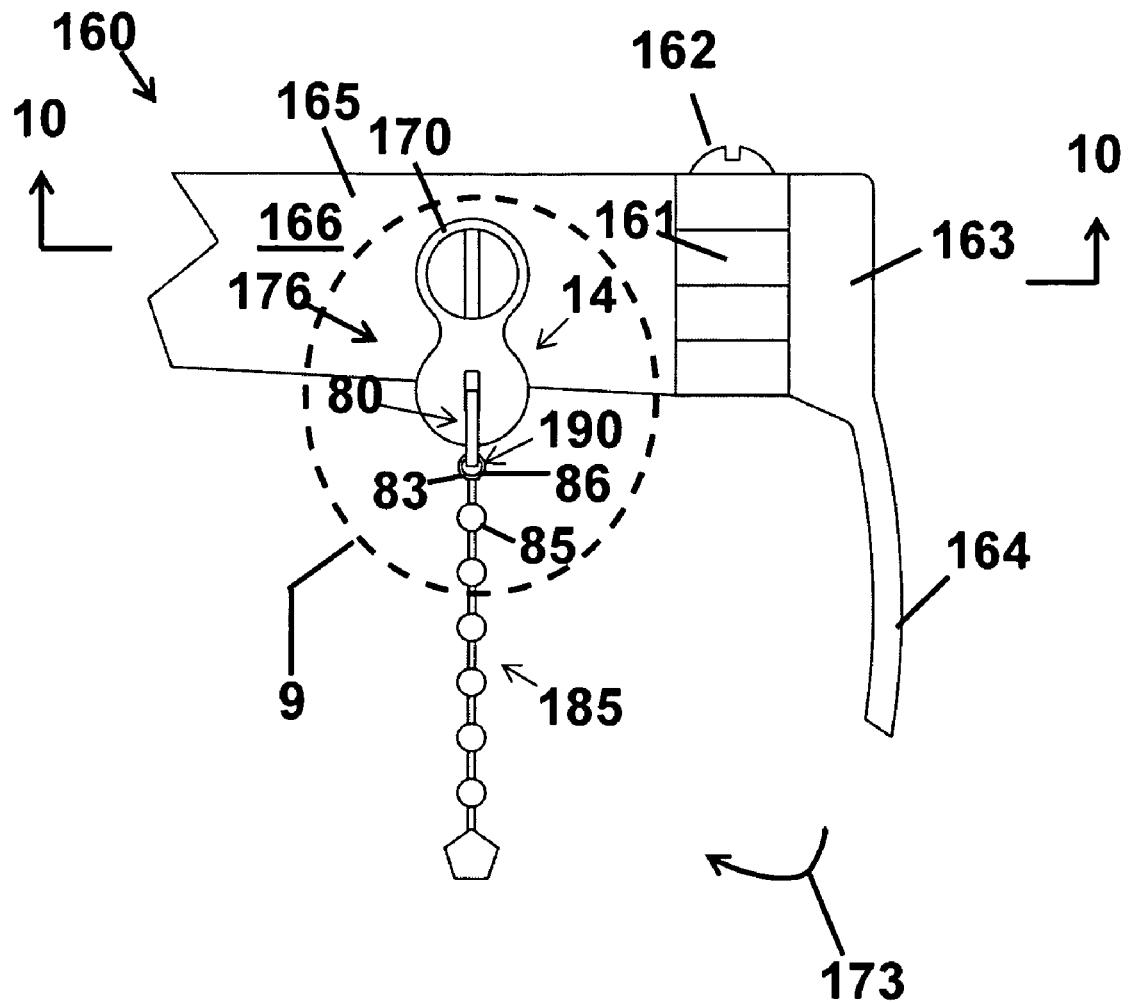
FIG. 8 depicts an inside side cross-sectional view of an apparatus having ornamentation, in accordance with embodiments of the present invention.

FIG. 8 depicts an inside side cross-sectional view of an ornamented eyeglass apparatus 160, comprising: a side arm 165, a front portion 163, and a hinge 161, therebetween. The hinge 161 comprises a hinge fastener 162. The hinge fastener 162 may be a screw.

The ornamented eyeglass apparatus 160 may be an eyeglass frame having ornamentation. When the ornamented eyeglass apparatus 160 is an eyeglass frame having ornamentation, a front portion 163 of the ornamented eyeglass apparatus 160 may comprise a lens encompassing portion 164.

In FIG. 8, the elongated body 14 of the ornamental assembly 176 may advantageously be installed against a first surface 166 of the side arm 165 of the apparatus having ornamentation 160, by inserting a screw 170 in the direction of the arrow 173 into the opening 30 of the elongated body 30, depicted in FIG. 7, and described in associated text. In one embodiment, the surface 50 of the elongated body 14 may be parallel to the surface 166 of the sidearm 165 of the ornamented eyeglass apparatus 160.

In FIG. 8, the ornamental fastener 80 has been operably coupled to the second end 13 of the elongated body 14. The ornamental fastener 80 comprises an eyelet 190, an eyelet opening 83, a shank 87, a lock 82, a bend 84, a grip 88, and an end 81, as depicted in FIGS. 3-4, and described in text herein. FIG. 3 depicts operably coupling the ornamental fastener 80 and the end 13 of the elongated body 14 by inserting the end 81 of the ornamental fastener 80 into the opening 25 of the second end 13 of the elongated body 14, so that the lock 82 spans the gap 89 between the shank 87 and the grip 88, so that the lock 82 may block removal of the ornamental fastener 80 from the opening 25 of the second end 13 of the elongated body 14.

The eyelet 190 of the fastener 80 may be operably coupled to the eyelet 86 of the ornament 85, depicted in FIGS. 3, 5, and described in text herein. The eyelet opening 83 of the eyelet 190 of the fastener 80 may be operably coupled to the ornament 85 using eyelet 86 of the ornament 85. The eyelet 86 of the ornament 85 may be operably coupled to the eyelet 190 of the fastener 80, for example, by threading one end of a string through the eyelet opening 83 and tied to the eyelet 190 of the fastener 80 and the other end threaded through the eyelet opening 183 of the eyelet 86 of the ornament 85, and tied to the eyelet 86 of the of the ornament 85.

The eyelet 86 may be a split ring washer that operably couples the eyelet 190 to an eyelet 86 of the ornament 85 by inserting the eyelet 190 into the slot of the split ring washer and then mechanically forcing the slot to close.

The ornament 85 may be an extended ornamental chain 185 comprising decorative members such as pearls, cut glass, semi-precious stones, shells, black obsidian, onyx, mother-of-pearl, or diamonds.

In one embodiment, the surface 50 of the elongated body 14 is parallel to the surface 166 of the sidearm 165 of the ornamented eyeglass apparatus 160, and the second end 13 of the elongated body 14 has an opening 25, such as a slit from which the ornament 85 may be hung.

It is an object of the present invention to avoid having the ornament 85 become a distraction or annoyance because the movement caused by a person moving his or her head becomes visible because the moving ornament 85 is in a person's field of vision. Hanging the ornament 85 from the elongated body 14 affixed to the sidearm 165, depicted in FIG. 8, instead of from the hinge 66 depicted in FIGS. 3, 5, may move the ornament 85 out of the person's field of vision.

Figure 9:
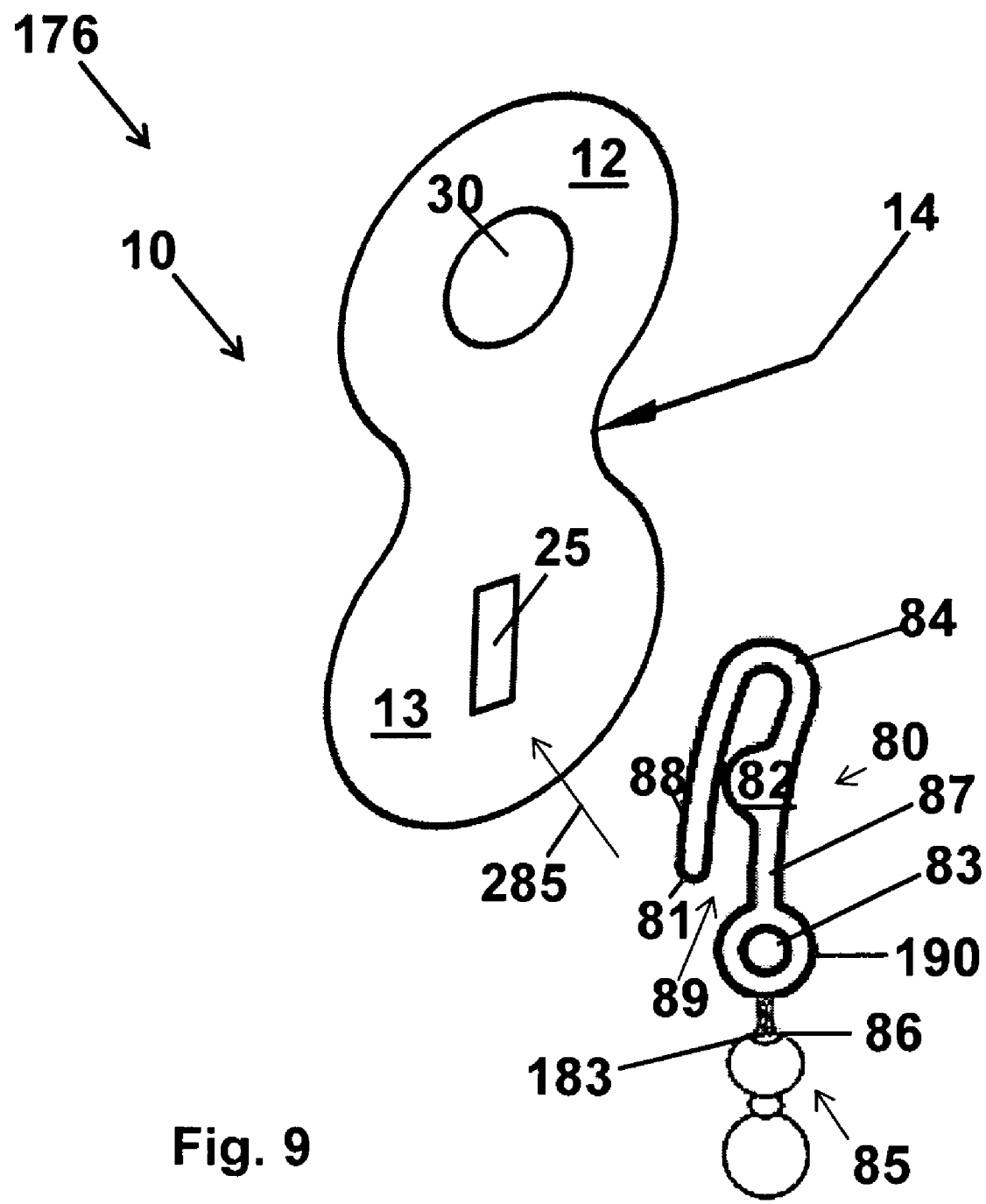
FIG. 9 depicts an expanded view of the ornamental assembly illustrated in FIG. 8, in accordance with embodiments of the present invention.

FIG. 9 depicts an expanded view of the ornamental assembly 176 defined within the elliptical hashed line 9 illustrated in FIG. 8. The ornamental assembly 176 comprises the coupling device 10, after the releasably coupled breakaway tab 37, 72 has been broken off at the breakaway 35, 71. An ornamental fastener 80 has been operably coupled to the second end 13 of the elongated body 14. The ornamental fastener 80, also depicted in FIG. 3, and described in associated text, comprises an eyelet 190, an eyelet opening 83, a shank 87, a lock 82, a bend 84, a grip 88, and an end 81.

In FIG. 9, the ornamental fastener 80 may be operably coupled to the second end 13 of the elongated body 14 by inserting the end 81 of the ornamental fastener 80 in the direction of the arrow 285 into the opening 25 of the second end 13 of the elongated body 14, so that the lock 82 spans the gap 89 between the shank 87 and the grip 88, so that the lock 82 may block removal of the ornamental fastener 80 from the opening 25 of the second end 13 of the elongated body 14.

The ornamental fastener 80 comprises an eyelet 190, an eyelet opening 83, a shank 87, a lock 82, a bend 84, a grip 88, and an end 81, as depicted in FIGS. 3-4, and described in text herein. FIG. 3 depicts operably coupling the ornamental fastener 80 and the end 13 of the elongated body 14 by inserting the end 81 of the ornamental fastener 80 into the opening 25 of the second end 13 of the elongated body 14, so that the lock 82 spans the gap 89 between the shank 87 and the grip 88, so that the lock 82 may block removal of the ornamental fastener 80 from the opening 25 of the second end 13 of the elongated body 14.

The eyelet 190 of the fastener 80 may be operably coupled to the eyelet 86 of the ornament 85, depicted in FIGS. 3, 5, and described in text herein. The eyelet opening 83 of the eyelet 190 of the fastener 80 may be operably coupled to the ornament 85 using eyelet 86 of the ornament 85. The eyelet 86 of the ornament 85 may be operably coupled to the eyelet 190 of the fastener 80, for example, by threading one end of a string through the eyelet opening 83 and tied to the eyelet 190 of the fastener 80 and the other end threaded through the eyelet opening 183 of the eyelet 86 of the ornament 85, and tied to the eyelet 86 of the of the ornament 85.

The eyelet 86 may be a split ring washer that operably couples the eyelet 190 to an eyelet 86 of the ornament 85 by inserting the eyelet 190 into the slot of the split ring washer and then mechanically forcing the slot to close.

The ornament 85 may be an extended ornamental chain 185 comprising decorative members such as pearls, cut glass, semi-precious stones, shells, black obsidian, onyx, mother-of-pearl, or diamonds.

Figure 10:
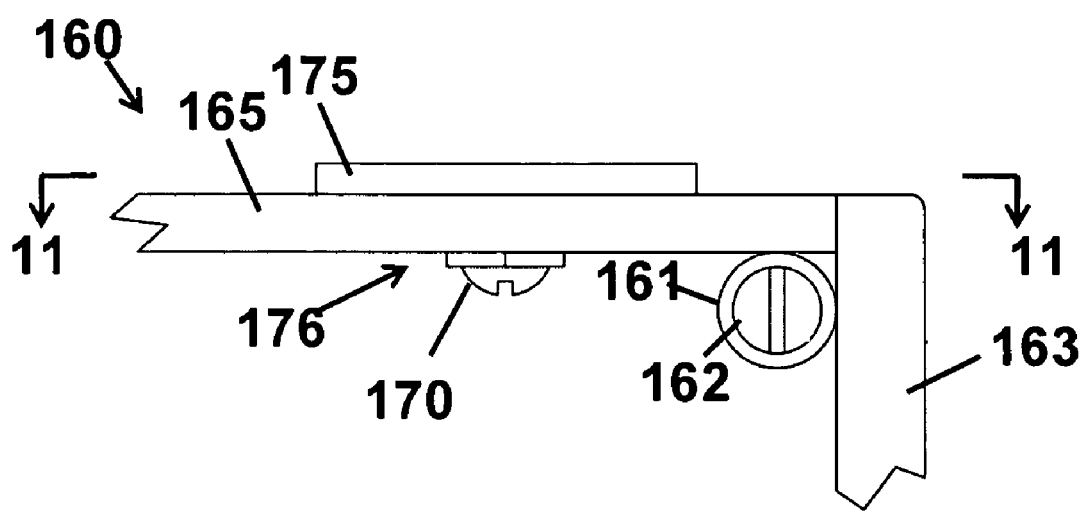
FIG. 10 depicts a top plan view of the apparatus having ornamentation, in accordance with embodiments of the present invention.

FIG. 10 depicts a top plan view of the ornamented eyeglass apparatus 160, taken along the line 10-10, illustrated in FIG. 8, comprising a side arm 165, a front portion 163, and a hinge 161, therebetween. The hinge 161 comprises a hinge fastener 162. The hinge fastener 162 may be a screw.

FIGS. 8 and 10 depict the elongated body 14 of the ornamental assembly 176 may advantageously be installed against a first surface 166 of the side arm 165 of the apparatus having ornamentation 160, by inserting a screw 170 in the direction of the arrow 173 into the opening 30 of the elongated body 30, depicted in FIG. 7, and described in associated text. A label 175 may be affixed to the outside face 178 of the side arm 165 by inserting a screw 170 having a length sufficiently long to extend beyond the width of the side arm 165 so that a portion of the screw 170 extends into and holds the label 175 against the outer face of the side arm 165. The label 175 may be made of polished steel, plastic or ornamental stone.

Figure 11:
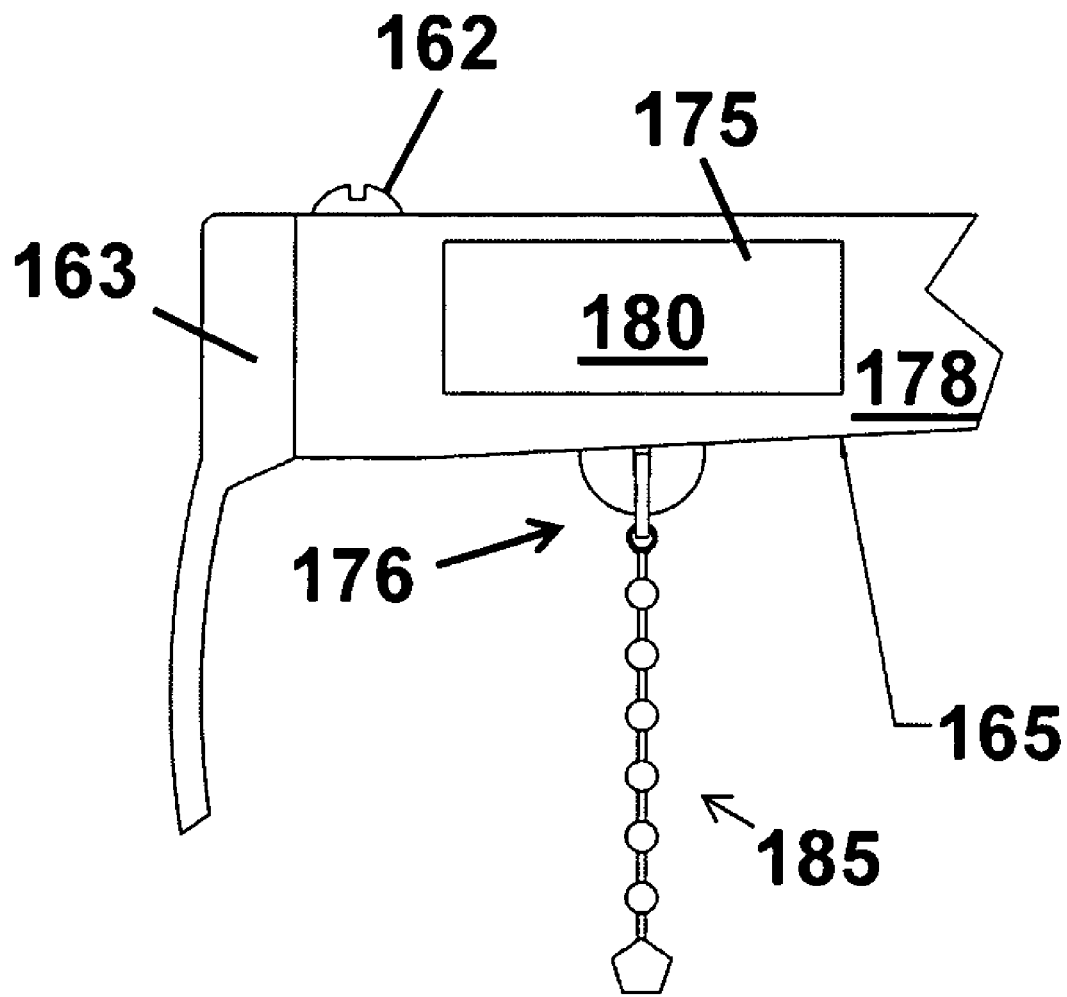
FIG. 11 depicts a side elevation view of the apparatus having ornamentation, taken along the line 11-11, in accordance with embodiments of the present invention.

FIG. 11 depicts a side elevation view of the ornamented eyeglass apparatus 160, taken along the line 11-11, illustrated in FIG. 10, comprising: a side arm 165, a front portion 163, and a hinge 161, therebetween. The hinge 161 comprises a hinge fastener 162. The hinge fastener 162 may be a screw. The label 175 may be affixed to the outside face 178 of the side arm 165 by inserting a screw 170 into the inside surface 166 of the side arm 165 having a length sufficiently long to extend beyond the width of the side arm 165 so that a portion of the screw 170 extends into and holds the label 175 against the outer face of the side arm 165, without penetrating the surface 180 of the label 175.

FIGS. 12A-12C depict a method 900 for operably coupling an ornament 85 to an inside surface 166 of a side arm 165 of an ornamented eyeglass apparatus 160, as depicted in FIGS. 1-5, and 7-11, and described in associated text, herein.

A step 905 provides a side arm 165 of the ornamented eyeglass apparatus 160 having an inside surface 166.

A step 910 of the method 100 provides a coupling device 10 comprising: an elongated body 14 having first and second sections 12, 13. A first surface 50 of each section 12, 13 has an opening 30, 25 therein. The opening 30 in the first surface 50 of the first section 12 has been adapted to receive a screw 70 for operably coupling the coupling device 10 to the inside surface 166 of the side arm 165. The opening 25 in the first surface 50 of the second section 13 has been adapted to receive an ornamental fastener 80. The step 910 provides the coupling device 10, further comprising a breakaway tab 37, releasably coupled to the elongated body 14; and a breakaway 35, therebetween, wherein the breakaway 35 is not between the breakaway tab 37 and an end A of the first section 12 of the elongated body 14.

A step 915 of the method 900 provides a screw 70 having a head 77, and either an elongated stem 79 having a threaded first portion 76 adjacent to the head 77 of the screw 70 and a releasably coupled non-threaded second portion 74 extending from the threaded first portion 76, and a breakaway 75 therebetween, or an elongated stem 79 having a threaded first portion 76 adjacent to the head 77 of the screw 70 without a non-threaded second portion 74 extending from the threaded first portion 76, a breakaway tab 72 releasably coupled to the head 77 of the screw 70 and a breakaway 71 therebetween.

A step 920 of the method 900 provides inserting the coupling device 10 between a head 77 of the screw 70 and the inside surface 165 of the side arm 166 and rotating the screw 70, by aligning either the non-threaded second portion 74 of the elongated stem 79 with the opening 30 in the first surface 50 of the first section 12 of the coupling device 10 and with the inside surface 165 of the side arm 166 or the threaded first portion 76 of the elongated stem 79 without the non-threaded second portion 74 extending from the threaded first portion 76 by manipulating either the non-threaded second portion 74 of the elongated stem 79 and the breakaway tab 37 of the coupling device 10 or breakaway tab 72 releasably coupled to the head 77 of the screw 70 and the breakaway tab 37 releasably coupled to the elongated body 14 so that the threaded first portion 76 of the elongated stem 79 fastens the coupling device 10 to the inside surface 165 of the side arm 166.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

I claim:

1. An ornamented eyeglass apparatus, comprising:
an eyeglass frame;
a first side piece, comprising an inside surface,
a coupling device operably coupled to the inside surface, comprising:
an elongated body having first and second sections, wherein a first surface of each section has an opening therein, wherein the opening in the first surface of the first section has been adapted to receive a screw for operably coupling the coupling device to the inside surface of the first side piece and the opening in the first surface of the second section has been adapted to receive an ornamental fastener;
a breakaway tab, releasably coupled to the elongated body; and
a breakaway, therebetween,
wherein the breakaway is not between an end of the first section of the elongated body.

2. The ornamented eyeglass apparatus of claim 1, wherein the ornamental fastener comprises an eyelet, an eyelet opening, a shank, a bend, a grip, and an end.

3. The ornamented eyeglass apparatus of claim 2, wherein a lock operably coupled to the shank of the ornamental fastener restricts a gap between the shank and the grip of the ornamental fastener.

4. A method for operably coupling an ornament to an inside surface of a side arm of an apparatus having ornamentation, comprising:
providing a side arm having, an inside surface,
providing a coupling device comprising:
an elongated body having first and second sections, wherein a first surface of each section has an opening therein, wherein the opening in the first surface of the first section has been adapted to receive a screw for operably coupling the coupling device to the inside surface of the side arm and the opening in the first surface of the second section has been adapted to receive an ornamental fastener;
operably coupling the coupling device to the inside surface of the side arm;
suspending the ornamental fastener from the opening in the first surface of the second section; and
suspending an ornament from the ornamental fastener.

5. The method of claim 4, wherein the ornamental fastener comprises an eyelet, an eyelet opening, a shank, a bend, a grip, and an end.

6. The method of claim 5, wherein the shank further comprises a lock, wherein the lock, the shank, and the grip are coextensive and coplanar.

7. The method of claim 6, wherein a width of a gap between the shank and the apex of the lock is from about 0.01 to 0.02 in.

8. The method of claim 4, wherein the first surface of the elongated body and a surface of the breakaway tab are coextensive and coplanar.

9. The method of claim 4, wherein the breakaway is between the breakaway tab and the opening adapted to receive the ornamental fastener.

10. The method of claim 4, wherein a head of the screw is releasably coupled to a breakaway tab.

11. The method of claim 4, wherein a width of the breakaway is less than or equal to 0.010 in. +/−10%, and a length of the breakaway is less than or equal to from about 0.005 in. to about 0.007 in. when the diameter of the opening in the first section is from about 0.0675 in. to about 0.0825 in.

12. The method of claim 4, wherein operably coupling the coupling device to the inside surface of the side arm comprises:
providing a screw selected from the group consisting of a screw having a head and an elongated stem, wherein the elongated stem has a threaded first portion adjacent to the head of the screw and a releasably coupled non-threaded second portion extending from the threaded first portion, and a breakaway therebetween, and a screw having a head and an elongated stem, wherein the elongated stem has a threaded first portion adjacent to the head of the screw without a non-threaded second portion extending from the threaded first portion, and wherein a breakaway tab is releasably coupled to the head of the screw and a breakaway therebetween;
inserting the coupling device between a head of the screw and the inside surface of the side arm; and
rotating the screw.

13. The method of claim 12, wherein rotating the screw comprises:
aligning the non-threaded second portion of the elongated stem of the screw with the opening in the first surface of the first section of the elongated body of the coupling device and with the inside surface of the side arm by manipulating the non-threaded second portion of the elongated stem and the breakaway tab of the coupling device so that the threaded first portion of the elongated stem of the screw fastens the coupling device to the inside surface of the side arm.

14. The method of claim 12, wherein rotating the screw comprises:
aligning the threaded first portion of the elongated stem of the screw, without the non-threaded second portion extending from the threaded first portion, with the opening in the first surface of the first section of the coupling device and with the inside surface of the side arm by manipulating the breakaway tab releasably coupled to the head of the screw and the breakaway tab releasably coupled to the elongated body of the coupling device so that the threaded first portion of the elongated stem of the screw fastens the coupling device to the inside surface of the side arm.

15. An ornamented eyeglass apparatus, comprising:
an eyeglass frame;
a first side piece, comprising an inside surface,
wherein a proximal end of the first side piece is operably coupled to a first end of the eyeglass frame by a first hinge therebetween;
a coupling means for operably coupling an ornamental fastener to the inside surface of the first side piece, comprising:
an elongated body having first and second sections, wherein a first surface of each section has an opening therein, wherein the opening in the first surface of the first section of the coupling means has been adapted to receive a screw for operably coupling the coupling means to the inside surface of the first side piece and the opening in the first surface of the second section of the coupling means has been adapted to receive the ornamental fastener;
a breakaway tab, releasably coupled to the elongated body; and
a breakaway, therebetween,
wherein the breakaway is not between an end of the first section of the elongated body;
an ornamental fastener suspended from the opening in the first surface of the second section; and
an ornament suspended from the ornamental fastener.

16. The ornamented eyeglass apparatus of claim 15, wherein the ornamental fastener comprises an eyelet, an eyelet opening, a shank, a bend, a grip, and an end.

17. The ornamented eyeglass apparatus of claim 16, wherein a lock operably coupled to the shank of the ornamental fastener restricts a gap between the shank and the grip of the ornamental fastener.

18. The ornamented eyeglass apparatus of claim 17, wherein the shank further comprises a lock, wherein the lock, the shank, and the grip are coextensive and coplanar.

19. The ornamented eyeglass apparatus of claim 18, wherein a width of the gap between the shank and the apex of the lock is from about 0.01 to 0.02 in.

20. The ornamented eyeglass apparatus of claim 16, wherein a head of the screw is releasably coupled to a breakaway tab by a breakaway, therebetween.

21. The ornamented eyeglass apparatus of claim 15, wherein the first surface of each section of the elongated body of the coupling means and a surface of the breakaway tab of the coupling means are coextensive and coplanar.

22. The ornamented eyeglass apparatus of claim 15, wherein the breakaway of the coupling means is between the breakaway tab of the coupling means and the opening of the coupling means adapted to receive the ornamental fastener.

23. The ornamented eyeglass apparatus of claim 22, wherein a width of the breakaway is less than or equal to 0.010 in. +/−10%, and a length of the breakaway is less than or equal to from about 0.005 in. to about 0.007 in. when the diameter of the opening in the first section is from about 0.0675 in. to about 0.0825 in.

* * * * *